United States Patent
Inoue (10) Patent No.: US 12,486,007 B2
(45) Date of Patent: Dec. 2, 2025

(54) TRAILERING SUPPORT DEVICE AND METHOD, AND MARINE VESSEL INCLUDING TRAILERING SUPPORT DEVICE

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 85 days.

(21) Appl. No.: 18/528,845

(22) Filed: Dec. 5, 2023

(65) Prior Publication Data

US 2024/0199177 A1 Jun. 20, 2024

(30) Foreign Application Priority Data

Dec. 16, 2022 (JP) .................. 2022-201311

(51) Int. Cl.
 *B63B 49/00* (2006.01)
 *B60P 3/10* (2006.01)
 *B63C 3/12* (2006.01)
 *G06T 7/80* (2017.01)

(52) U.S. Cl.
 CPC ............ *B63B 49/00* (2013.01); *B60P 3/1075* (2013.01); *B63C 3/12* (2013.01); *G06T 7/80* (2017.01)

(58) Field of Classification Search
 CPC ....... B63B 49/00; B63B 79/40; B60P 3/1075; B63C 3/12; G06T 7/80; B63H 25/04
 See application file for complete search history.

(56) References Cited

U.S. PATENT DOCUMENTS

| 12,280,863 B2 * | 4/2025 | Rezac .................. B60P 3/1058 |
| 2007/0162207 A1 | 7/2007 | Shimo et al. |
| 2018/0050772 A1 | 2/2018 | Koyano et al. |
| 2019/0300138 A1 * | 10/2019 | Akuzawa ................ G05D 1/02 |
| 2019/0344875 A1 | 11/2019 | Kishimoto et al. |
| 2020/0180740 A1 * | 6/2020 | Christ .................... B63B 23/26 |

(Continued)

FOREIGN PATENT DOCUMENTS

| JP | 2023-13062 A | 1/2023 |
| JP | 2023-18465 A | 2/2023 |
| WO | WO-2016163559 A1 * | 10/2016 ............ B60P 3/1033 |

(Continued)

OTHER PUBLICATIONS

Official Communication issued in corresponding European Patent Application No. 23214582.1, mailed on Apr. 25, 2024, 8 pages.

*Primary Examiner* — Joseph J Dallo
(74) *Attorney, Agent, or Firm* — Keating & Bennett, LLP (57) ABSTRACT

A trailering support device able to load a hull onto a trailer includes one or more controllers configured or programmed to acquire characteristic information indicating a relationship between a steering angle of the hull and a turning radius of the hull; acquire relative position information between the trailer and the hull; detect the steering angle of the hull; predict future movement of the hull based on the acquired characteristic information, the acquired relative position information, and the detected steering angle; generate a predicted trajectory; and provide notification of a positional relationship between the hull and the trailer and provide notification of the generated predicted trajectory.

16 Claims, 8 Drawing Sheets

(56) References Cited

U.S. PATENT DOCUMENTS

2023/0021321 A1    1/2023   Inoue
2023/0033273 A1    2/2023   Inoue

FOREIGN PATENT DOCUMENTS

| WO | WO-2018100748 A1 | * | 6/2018 | ............ | B63B 49/00 |
| WO | WO-2018100749 A1 | * | 6/2018 | ............ | B63B 49/00 |
| WO | WO-2018100750 A1 | * | 6/2018 | ............ | B63H 21/21 |

* cited by examiner

TRAILERING SUPPORT DEVICE AND METHOD, AND MARINE VESSEL INCLUDING TRAILERING SUPPORT DEVICE

CROSS REFERENCE TO RELATED APPLICATIONS

This application claims the benefit of Japanese Patent Application No. 2022-201311, filed Dec. 16, 2022, which is hereby incorporated by reference herein in its entirety.

BACKGROUND OF THE INVENTION

1. Field of the Invention

The present invention relates to a trailering support device and method, and a marine vessel including the trailering support device.

2. Description of the Related Art

Conventionally, loading a hull onto a trailer has been performed mainly to land a small hull. International Publication WO 2016/163559 discloses a technique for acquiring positions of a hull and a trailer and controlling a propulsion device or the like to automatically load (mount) the hull onto the trailer. Meanwhile, there is a case in which it is desired to manually perform trailering.

However, the way the hull behaves in response to an operation such as steering varies depending on the specifications of the hull. Therefore, it is not easy for an inexperienced vessel operator to accurately predict how the hull turns when the hull is steered at a certain angle. Therefore, manual trailering is not always easy.

SUMMARY OF THE INVENTION

Preferred embodiments of the present invention provide trailering support devices and methods able to support a trailering operation, and marine vessels including the trailering support devices.

According to a preferred embodiment of the present invention, a trailering support device for loading a hull onto a trailer includes one or more controllers configured or programmed to function as a first acquisition unit to acquire characteristic information indicating a relationship between a steering angle of the hull and a turning radius of the hull; a second acquisition unit to acquire relative position information between the trailer and the hull; a detector to detect the steering angle of the hull; a generation unit to predict future movement of the hull based on the characteristic information acquired by the first acquisition unit, the relative position information acquired by the second acquisition unit, and the steering angle detected by the detector, and to generate a predicted trajectory; and a control unit to provide notification of a positional relationship between the hull and the trailer and to provide notification of the predicted trajectory generated by the generation unit.

According to this configuration, characteristic information indicating a relationship between a steering angle of a hull and a turning radius of the hull is acquired, relative position information between a trailer and the hull is acquired, and the steering angle of the hull is detected. The future movement of the hull is predicted based on the acquired characteristic information, the acquired relative position information, and the detected steering angle, and then a predicted trajectory is generated. Notification of a positional relationship between the hull and the trailer and the generated predicted trajectory is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
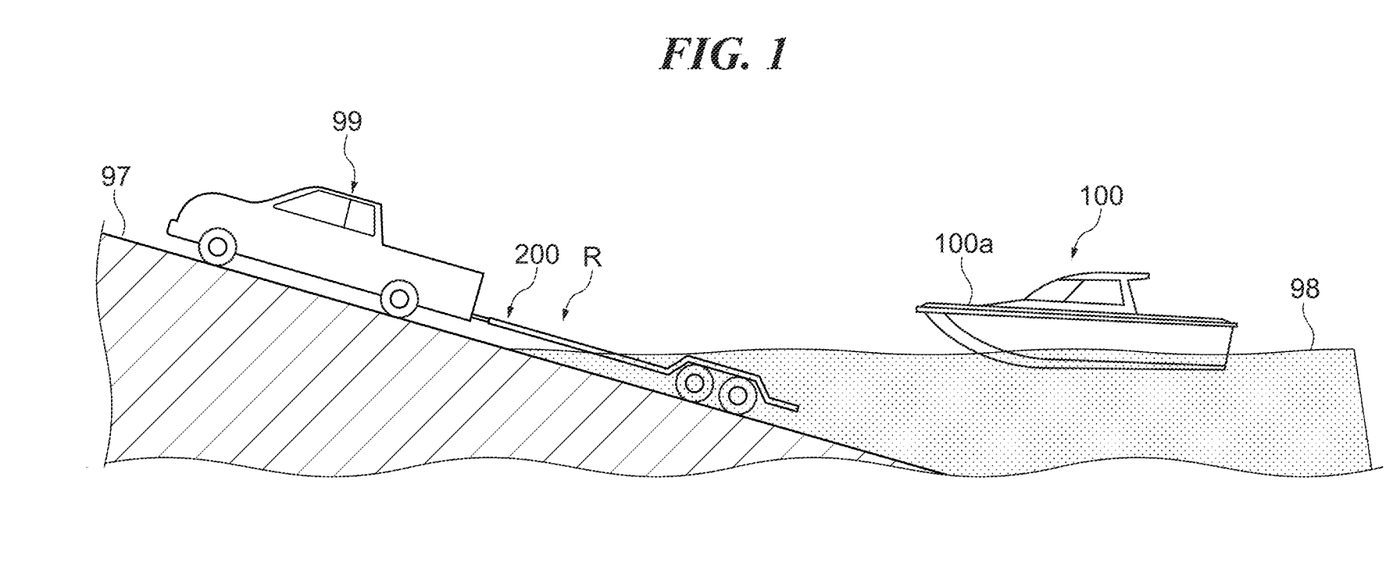
FIG. 1 is a side view illustrating an example of a trailering system to which a trailering support device is applied.
Figure 2:
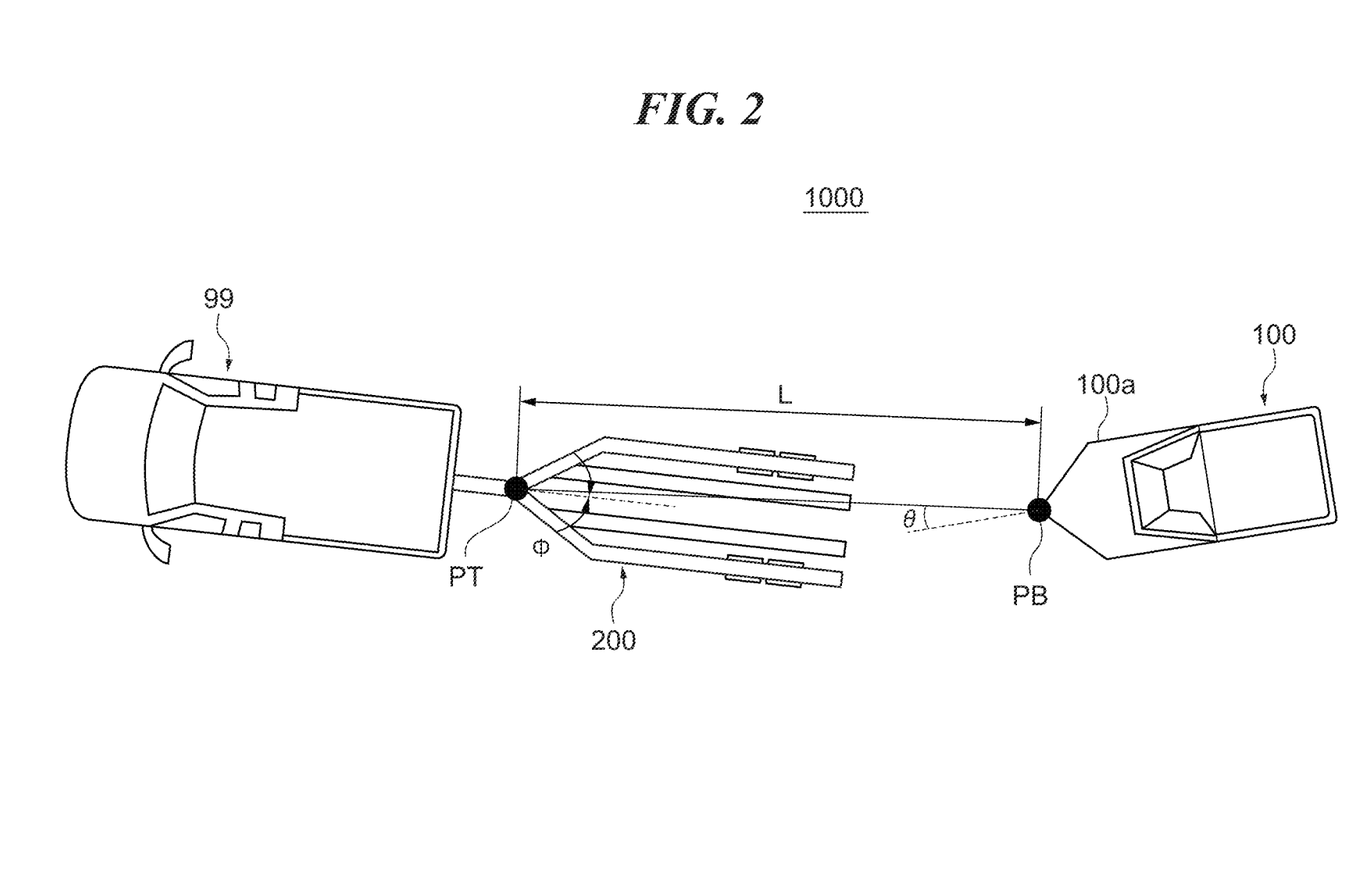
FIG. 2 is a top view illustrating an example of the trailering system.

FIG. 1 is a side view illustrating an example of a trailering system 1000 to which a trailering support device according to a first preferred embodiment of the present invention is applied. FIG. 2 is a top view illustrating an example of the trailering system 1000. The trailering system 1000 includes a marine vessel 100 and a trailer 200 on which the marine vessel 100 can be placed. The trailer 200 is for a marine vessel towed by a vehicle 99 operated by a driver. The marine vessel 100 may be, for example, a so-called jet boat.

The trailering system 1000 is able to detach the marine vessel 100 from the trailer 200 and attach the marine vessel to the trailer 200. An inclined portion (ramp) R inclined downwards toward the bottom of water is formed on the waterside. When moving the marine vessel 100 from the trailer 200 on land 97 to a water surface 98 (when the marine vessel 100 leaves the trailer 200), a driver drives the vehicle 99 to move the trailer 200 to the inclined portion R, as illustrated in FIG. 1. Then, a vessel operator of the marine vessel 100 moves the marine vessel 100 in a direction away from the trailer 200.

When moving the marine vessel 100 from the water surface 98 to the trailer 200 on the land 97 (when the marine vessel 100 is attached to the trailer 200), the driver first moves the trailer 200 to the inclined portion R. Then, the vessel operator of the marine vessel 100 manually steers the marine vessel 100 to move the marine vessel 100 to the inclined portion R, and then loads the marine vessel 100 onto the trailer 200.

Here, "relative position information" between the marine vessel 100 and the trailer 200 will be described. Reference positions in defining the relative position information include a reference position PT on the trailer 200 and a reference position PB on the marine vessel 100, as illustrated in FIG. 2. The reference position PT and the reference position PB may be respectively any portion of the trailer 200 and the marine vessel 100. The "relative position information" includes to an absolute position of a hull 100a and an absolute position of the trailer 200, and may include a distance L, a vessel azimuth φ (a second azimuth), and a trailer azimuth θ (a first azimuth). The distance L, the vessel azimuth φ, and the trailer azimuth θ are defined as quantities as viewed from above as illustrated in FIG. 2. The distance L may be defined by the absolute position of the hull 100a and the absolute position of the trailer 200.

The distance L is a distance between the trailer 200 and the marine vessel 100. That is, the distance L is a linear distance between the reference position PT and the reference position PB. The vessel azimuth φ is a relative azimuth (direction) of the marine vessel 100 as viewed from the trailer 200. The trailer azimuth θ is a relative azimuth (direction) of the trailer 200 as viewed from the marine vessel 100.

Figure 3:
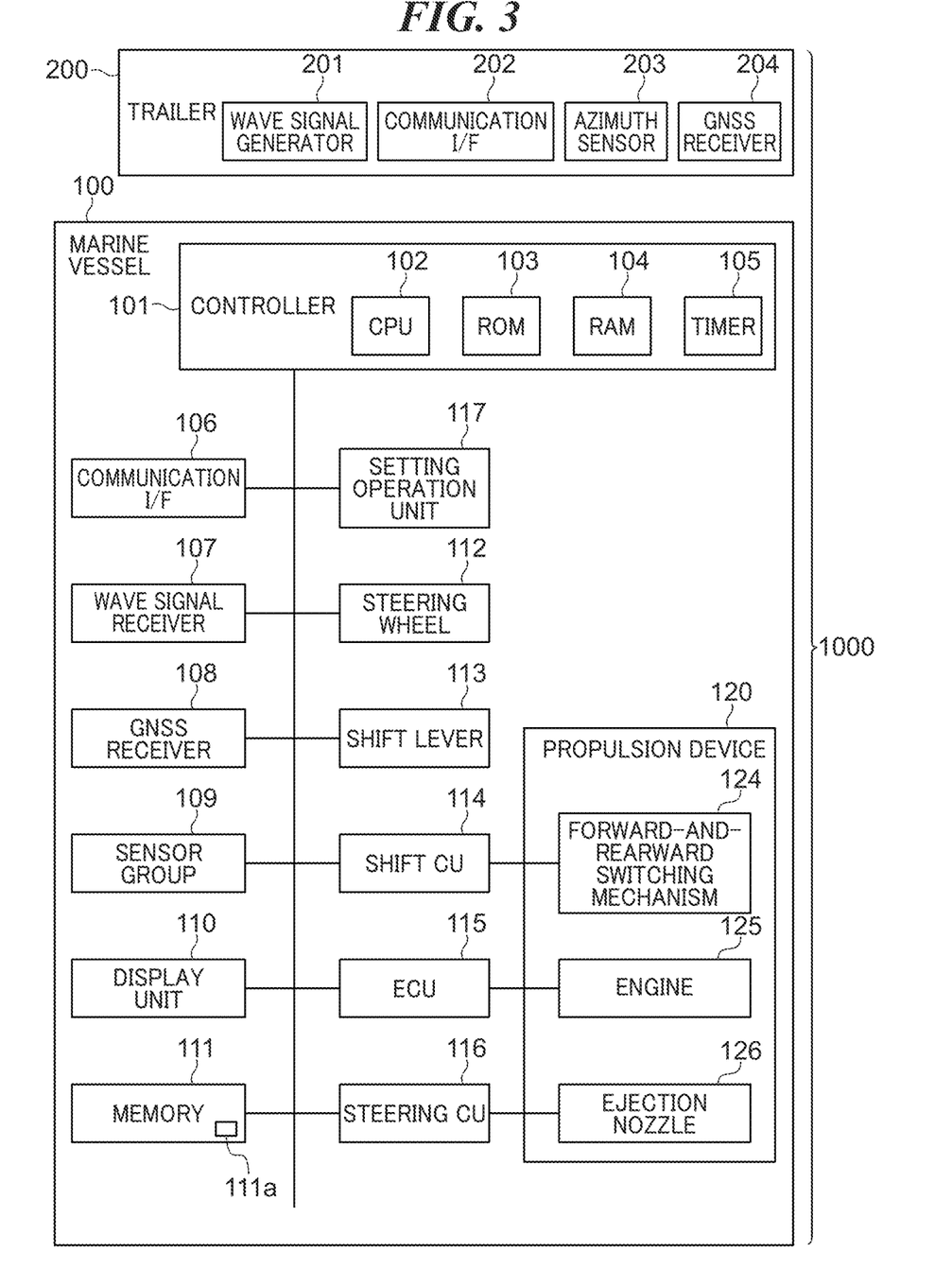
FIG. 3 is a block diagram of the trailering system.

FIG. 3 is a block diagram of the trailering system 1000. The marine vessel 100 includes the hull 100a (refer to FIGS. 1 and 2) and a propulsion device 120 provided on the hull 100a. The marine vessel 100 obtains a propulsive force by ejecting a jet of water by the propulsion device 120.

The propulsion device 120 includes an engine 125 to generate a driving force, a forward-and-rearward switching mechanism 124 to transmit the driving force of the engine 125 in an adjusted state, and an ejection nozzle 126 to eject a jet of water. The propulsion device 120 includes a propeller (not illustrated) to which the driving force of the engine 125 is transmitted via the forward-and-rearward switching mechanism 124. The propulsion device 120 generates a jet of water from the ejection nozzle 126 by rotating the propeller by the driving force. In addition, the propulsion device 120 adjusts the traveling direction of the marine vessel 100 by changing the ejection direction of the jet from the ejection nozzle 126 generated by the rotation of the propeller.

The marine vessel 100 further includes a controller 101, an engine control unit (ECU) 115, a shift control unit (CU) 114, and a steering CU 116. The controller 101 entirely controls the marine vessel 100 including the propulsion device 120. The controller 101 includes a CPU 102, a ROM 103, a RAM 104, and a timer 105, for example. The ROM 103 stores a control program. The CPU 102 implements various types of control processes by loading the control program stored in the ROM 103 to the RAM 104 and executing the control program. The RAM 104 provides a work area when the CPU 102 executes the control program.

The ECU 115, the shift CU 114, and the steering CU 116 control the engine 125, the forward-and-rearward switching mechanism 124, and the ejection nozzle 126, respectively, based on an instruction from the controller 101.

The marine vessel 100 further includes a sensor group 109. The sensor group 109 includes a tide sensor, a wind speed sensor, a wind direction sensor, an azimuth sensor, a steering angle sensor, a hook sensor, a water landing sensor, an acceleration sensor, a speed sensor, and an angular speed sensor (all not illustrated). The tide sensor detects a tide. The wind speed sensor detects a wind speed. The wind direction sensor detects a wind direction. The azimuth sensor detects an absolute azimuth of the hull 100a. The steering angle sensor detects a steering angle of hull 100a by detecting a rotation angle of a steering wheel 112.

The hook sensor detects that the hook of the trailer 200 is hooked on the hull 100a. The water landing sensor detects that the ejection nozzle 126 of the propulsion device 120 is located in the water. The acceleration sensor detects the posture of the hull 100a by detecting the inclination of the hull 100a in addition to detecting the acceleration of the hull 100a. The speed sensor detects the speed of the hull 100a, and the angular speed sensor detects the angular speed of the hull 100a. It is noted that it is not essential for the sensor group 109 to include all these sensors.

The steering wheel 112 and a shift lever 113 are provided on the hull 100a of the marine vessel 100. The controller 101 controls the ejection direction of the jet ejected from the ejection nozzle 126, via the steering CU 116, based on the rotation angle of the operated steering wheel 112. In addition, the controller 101 performs a control to change a shift position in the forward-and-rearward switching mechanism 124, via the shift CU 114, based on the position of the operated shift lever 113.

The marine vessel 100 further includes a memory 111, a display unit 110, a setting operation unit 117, a communication I/F 106, a wave signal receiver 107, and a GNSS receiver 108. The memory 111 may be a nonvolatile storage medium. The display unit 110 includes a display, and displays various types of information based on an instruction from the controller 101. The display unit 110 may have a function of generating sound. The setting operation unit 117 includes an operator to perform an operation related to vessel steering, a setting operator to perform various settings, and an input operator to input various instructions (all not illustrated).

The communication I/F 106 is able to communicate with an external device in a wireless and/or wired manner. The GNSS receiver 108 periodically receives a global navigation satellite systems (GNSS) signal from a GNSS satellite. A signal (described below) received by the wave signal receiver 107 and a signal received by the GNSS receiver 108 are supplied to the controller 101.

The trailer 200 includes a wave signal generator 201, a communication I/F 202, an azimuth sensor 203, and a GNSS receiver 204. The communication I/F 202 is able to communicate with an external device in a wireless and/or wired manner. The communication I/F 202 is further able to communicate with the communication I/F 106 by near field communication or the like. It is noted that a communication method between the marine vessel 100 and the trailer 200 is not limited. The GNSS receiver 204 periodically receives a GNSS signal from a GNSS satellite. The azimuth sensor 203 detects an absolute azimuth of the trailer 200.

The GNSS signal received by the GNSS receiver 204 is transmitted by the communication I/F 202 as a signal indicating a current position (an absolute position) of the trailer 200, and is received by the communication I/F 106 of the marine vessel 100. In addition, a signal indicating the azimuth (the absolute azimuth) of the trailer 200 detected by the azimuth sensor 203 is also transmitted by the communication I/F 202 and received by the communication I/F 106 of the marine vessel 100. The wave signal generator 201 and the wave signal receiver 107 will be described below.

When executing a predicted trajectory display process (described below with reference to FIG. 6), the controller 101 specifies a trailer (hereinafter, referred to as a "target trailer") on which the hull 100a is to be loaded. As a method for specifying the target trailer, a known method may be used. As an example of this method, for example, in a case where there are a plurality of trailers that transmit position information, the controller 101 acquires the current position of each trailer through wireless communication. Then, the controller 101 displays the acquired current positions of the trailers on the screen of the display unit 110. The controller 101 specifies, on the display screen, the target trailer by receiving designation of a desired position among the positions of the respective trailers from a user.

Alternatively, one of the trailers for which near field communication is established may be specified as the target trailer. In this case, the controller 101 may receive information on the current position of the target trailer by wireless communication.

Alternatively, a method disclosed in Japanese Patent Application No. 2021-122618 or Japanese Patent Application No. 2021-116970 may be used, the disclosures of which are herein incorporated by reference in their entirety, the marine vessel 100 may receive a laser beam or a wave signal emitted from a certain trailer such that the certain trailer may be specified as the target trailer. For example, the wave signal generator 201 provided in the trailer 200 emits a wave signal from at least three different positions whose "relative positional relationship" with each other is known. As an example, the wave signal may be an optical signal, the wave signal generator 201 may be three LEDs, and the wave signal receiver 107 may be a camera.

The relative position information may be specified based on the wave signal emitted from each position and received by the wave signal receiver 107 provided in the marine vessel 100. For example, the controller 101 can extract bright spots from an image obtained by the camera imaging the optical signals emitted from the three LEDs, and can acquire the relative position information (the trailer azimuth θ, the vessel azimuth φ, and the distance L) based on the positions of the bright spots in the image and the "relative positional relationship". It is noted that, in a case where a method that does not use a laser beam or a wave signal to identify the target trailer, it is not essential to provide the wave signal generator 201 and the wave signal receiver 107.

The memory 111 stores characteristic information 111a to be described below.

Figure 4:
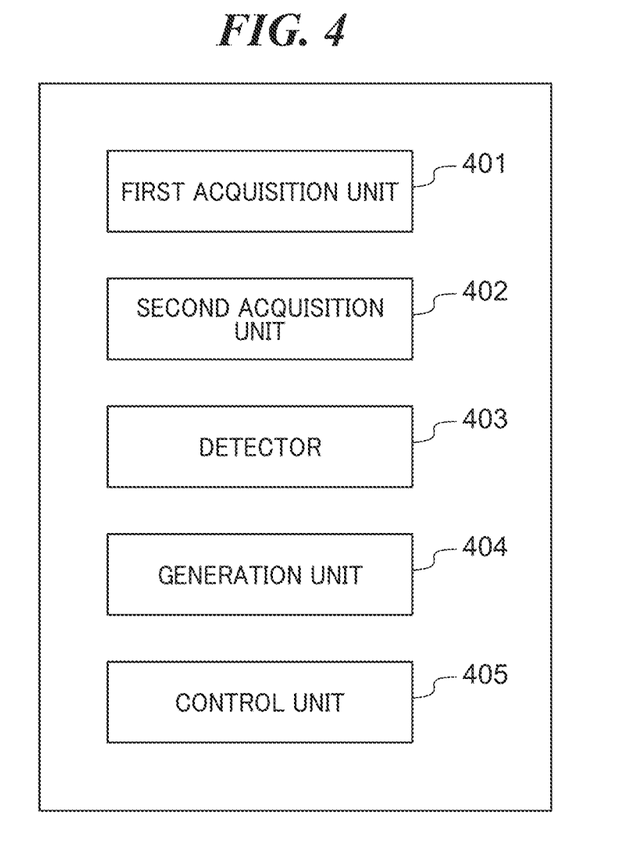
FIG. 4 is a diagram illustrating a functional block of the trailering support device.

FIG. 4 is a diagram illustrating a functional block of the trailering support device. The functional block includes, as functional units, a first acquisition unit 401, a second acquisition unit 402, a detector 403, a generation unit 404, and a control unit 405.

Each of these functional units is mainly implemented through cooperation between at least one of the communication I/F 106, the wave signal receiver 107, the GNSS receiver 108, the sensor group 109, the display unit 110, or the memory 111; and the controller 101.

The function of the first acquisition unit 401 is mainly implemented by the controller 101. The first acquisition unit 401 reads and acquires the characteristic information 111a from the memory 111. The characteristic information 111a is determined in advance as information indicating a relationship between the steering angle of the hull 100a and the turning radius of the hull 100a. For example, a manufacturer of the marine vessel 100 conducts an experiment using the hull 100a and measures the turning radius in a case where the steering angle is set to a certain value in a state where the vessel speed and the acceleration are kept constant, which is performed a plurality of times while changing the steering angle. Thereafter, the manufacturer obtains, by using an interpolation process or the like as necessary, a table or a function indicating the turning radius with respect to the steering angle, and stores the obtained table or function in the memory 111 as the characteristic information 111a.

The function of the second acquisition unit 402 is mainly implemented by the controller 101, the communication I/F 106, the wave signal receiver 107, the GNSS receiver 108, and the sensor group 109. The second acquisition unit 402 acquires the above-described relative position information. For example, the second acquisition unit 402 acquires the respective absolute positions of the hull 100a and the trailer 200 from the information received by the GNSS receiver 108 and the GNSS receiver 204, respectively. In addition, the second acquisition unit 402 may acquire the distance L, the vessel azimuth φ, and the trailer azimuth θ based on the wave signal received by the wave signal receiver 107.

The function of the detector 403 is mainly implemented by the controller 101 and the sensor group 109. The detector 403 detects the steering angle by the steering angle sensor of the sensor group 109.

The function of the generation unit 404 is mainly implemented by the controller 101. The generation unit 404 predicts a path of future movement of the hull 100a based on the characteristic information 111a acquired by the first acquisition unit 401, the relative position information acquired by the second acquisition unit 402, and the steering angle detected by the detector 403. Then, the generation unit 404 generates the predicted path of the future movement as a predicted trajectory 500. The predicted trajectory 500 will be described below in detail (FIG. 5).

The function of the control unit 405 is mainly implemented by the controller 101 and the display unit 110. The control unit 405 provides notification of a positional relationship between the hull 100a and the trailer 200, and provides notification of the predicted trajectory 500. For example, the control unit 405 displays, on the display screen of the display unit 110, an image showing the positional relationship between the hull 100a and the trailer 200, and displays the predicted trajectory 500 generated by the generation unit 404 in a state of being superimposed on the image.

Figure 5:
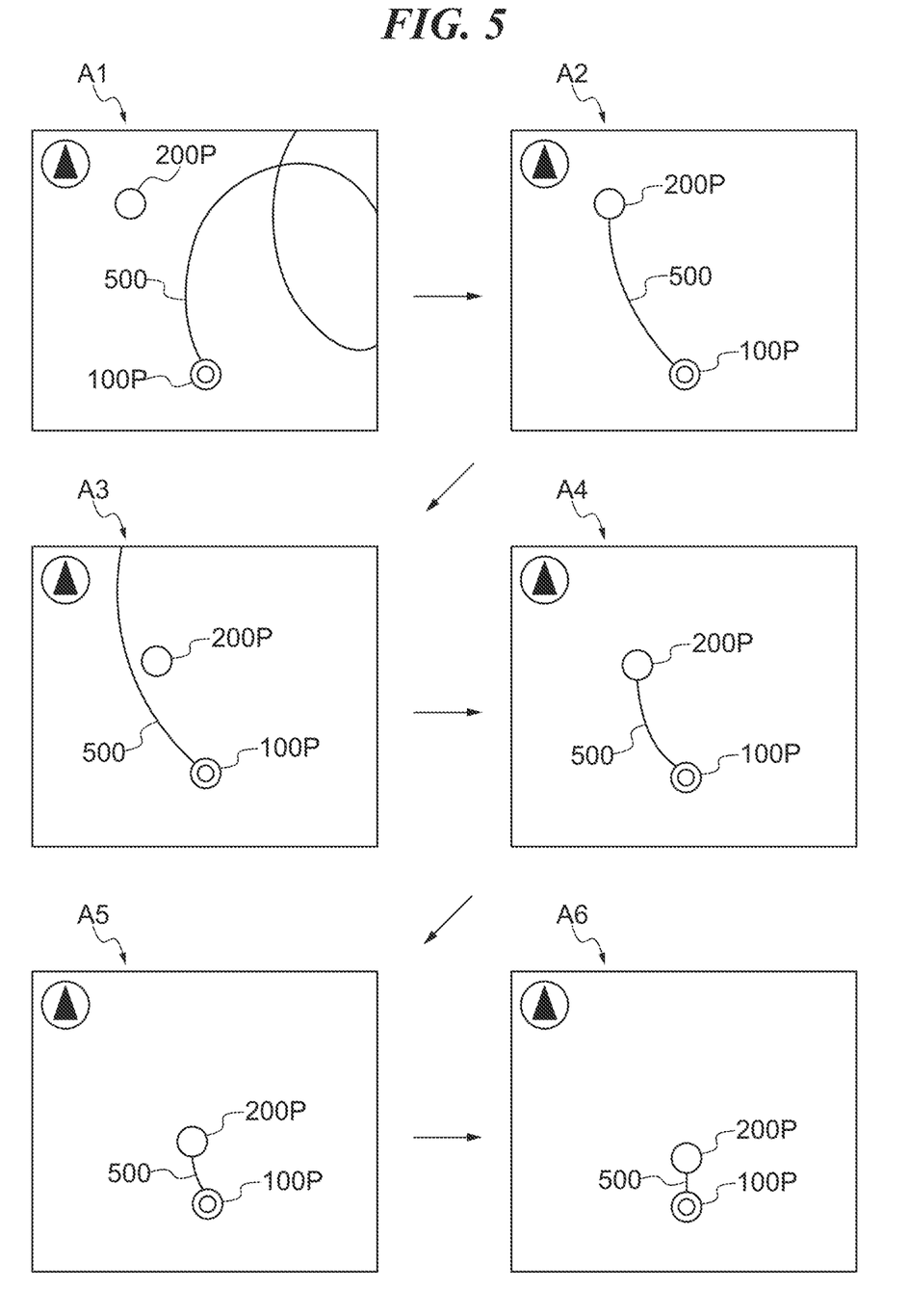
FIG. 5 is a transition diagram of a predicted trajectory display screen.

FIG. 5 is a transition diagram of a predicted trajectory display screen. The predicted trajectory display screen is displayed on the display unit 110 by a predicted trajectory display process (to be described below with reference to FIG. 6) executed in parallel with manual trailering. In FIG. 5, screens A1 to A6 corresponding to the transition of the state of the hull 100a are illustrated as the predicted trajectory display screens. The screens A1 to A6 are displayed after the start of the predicted trajectory display process is instructed and the target trailer is specified.

In the predicted trajectory display screen, the respective current positions of the hull 100a and the trailer 200 are displayed on a screen in which the azimuth is defined as an image in which the positional relationship between the hull 100a and the trailer 200 can be known. For example, a hull mark 100P indicating the position of the hull 100a and a trailer mark 200P indicating the position of the target trailer are displayed on the predicted trajectory display screen. In the predicted trajectory display screen, for example, the upper side of the display screen is set to the north, and the display position of the hull mark 100P is set as a reference (fixed). In the predicted trajectory display screen, the display position of the hull mark 100P is set as the reference (fixed), and the relative position of the trailer 200 with respect to the hull 100a is indicated by the trailer mark 200P. Further, the predicted trajectory 500 starting from the hull mark 100P is displayed in a state of being superimposed on the image (the indications of the hull mark 100P and the trailer mark 200P displayed) in which the positional relationship between the hull 100a and the trailer 200 can be known.

Note that, it is not essential that the relative position information includes the trailer azimuth θ and the vessel azimuth φ if considering only to display the screen on which the positional relationship between the hull 100a and the trailer 200 can be known, and it is sufficient that the relative position information includes at least the positional information of one of the hull 100a and the trailer 200 with respect to the other one of the hull 100a and the trailer 200 as the reference. Therefore, it is not essential to obtain both the position of the hull 100a and the position of the trailer 200. That is, for example, it is sufficient if the absolute position of the hull 100a, the direction in which the trailer 200 exists with respect to the hull 100a, and the distance from the hull 100a to the trailer 200 are known (are acquired).

The control unit 405 displays the hull mark 100P at a determined position on the screen. In addition, the control unit 405 displays the trailer mark 200P at a relative position with respect to the hull mark 100P based on the relationship between the position of the trailer 200 and the position of the hull 100a indicated by the relative position information. Further, the control unit 405 displays the predicted trajectory 500 generated by the generation unit 404 superimposed on the indications of the hull mark 100P and the trailer mark 200P. In this manner, the predicted trajectory display screen is created. Then, the transition of the predicted trajectory display screen will be described with reference to the screens A1 to A6 mentioned above.

The screen A1 illustrates an initial state, which is a state immediately after the start of the predicted trajectory display process. In this state, the predicted trajectory 500 significantly deviates from the trailer mark 200P.

The screen A2 is displayed in a state where the vessel operator operates the steering wheel 112, and steers the hull 100a so that the hull 100a heads toward the trailer 200. In this state, the predicted trajectory 500 passes through the trailer mark 200P. It is noted that, even in a case where the predicted trajectory 500 passes through the trailer mark 200P, a range to be displayed of the predicted trajectory 500 is not limited to a range from the hull mark 100P to the trailer mark 200P. A range of the predicted trajectory 500 after passing through the trailer mark 200P may be further displayed.

The screen A3 is displayed in a state where the hull 100a has been navigated after the state in which the screen A2 is displayed. It is noted that the predicted trajectory 500 is generated over time, from time to time, and the display thereof is updated. The display position of the hull mark 100P is fixed, and therefore the position of the trailer mark 200P changes on the screen A3. As a result of the movement of the hull 100a, the predicted trajectory 500 deviates from the trailer mark 200P on the screen A3.

The screen A4 is displayed in a state where the vessel operator operates the steering wheel 112 again in a state where the screen A3 is displayed, and steers the hull 100a so that the hull 100a heads toward the trailer 200. In this state, the predicted trajectory 500 passes through the trailer mark 200P again.

The screen A5 is displayed in a state where the hull 100a has been navigated after the state in which the screen A4 is displayed. After the hull 100a has moved, a state in which the predicted trajectory 500 passes through the trailer mark 200P is maintained on the screen A5.

The screen A6 is displayed in a state where the hull 100a has been navigated after the state in which the screen A5 is displayed. In the screen A6, a state in which the predicted trajectory 500 passes through the trailer mark 200P is maintained, and at this time, the marine vessel 100 is in a state immediately before being loaded onto the trailer 200.

Normally, when this vessel steering state is continued, loading of the marine vessel 100 onto the trailer 200 is performed.

Figure 6:
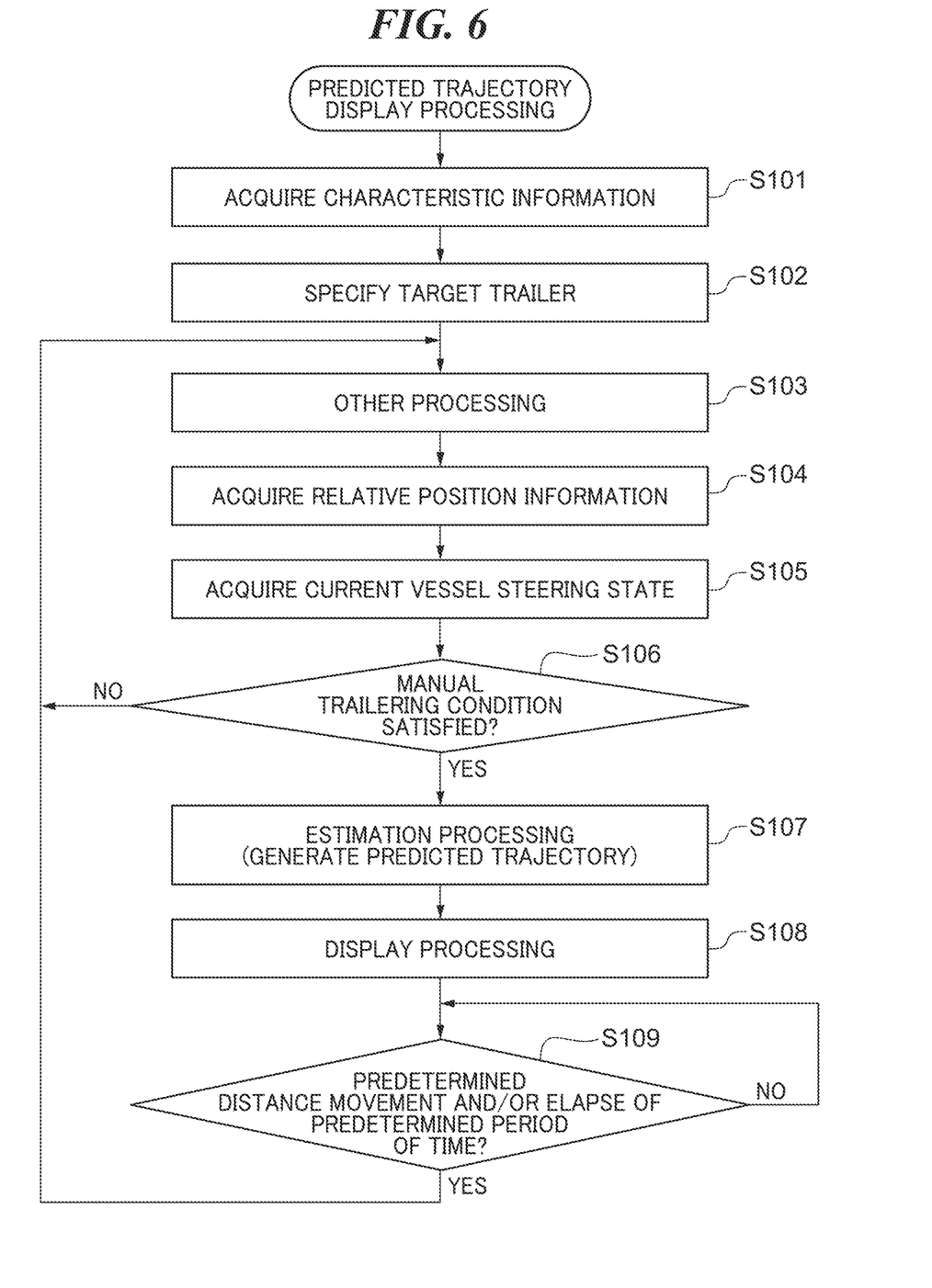
FIG. 6 is a flowchart illustrating predicted trajectory display process.

FIG. 6 is a flowchart illustrating the predicted trajectory display process. This process is started in response to an instruction to start the predicted trajectory display process. This process is implemented by the CPU 102 loading the control program stored in the ROM 103 in the RAM 104 and executing the control program. The predicted trajectory display process will be described also with reference to FIG. 5.

In step S101, the CPU 102 reads and acquires the characteristic information 111a from the memory 111. In step S102, the CPU 102 specifies, by the above-described method, a target trailer onto which the hull 100a is to be loaded. In step S103, the CPU 102 executes other processes. Here, the CPU 102 can execute, for example, a process to end the predicted trajectory display process illustrated in FIG. 6, and the like, in response to an instruction from a user.

In step S104, the CPU 102 acquires relative position information. In step S105, the CPU 102 acquires a current vessel steering state. Here, the CPU 102 acquires a steering angle and a speed of the hull 100a from the detection result by the sensor group 109.

In step S106, the CPU 102 determines whether or not a "manual trailering condition" is satisfied. Here, the manual trailering condition is that both the speed of the hull 100a and the distance L satisfy a predetermined condition. Therefore, in a case where at least one of the speed of the hull 100a or the distance L does not satisfy the predetermined condition, the manual trailering condition is not satisfied.

Specifically, the manual trailering condition is satisfied when the speed of the hull 100a is less than a predetermined speed and the distance L indicated by the relative position information is less than a first predetermined distance. The predetermined speed is set to a value of a low speed corresponding to a speed of the hull 100a in an idle state, the hull 100a is held at a fixed point, or the like. The first predetermined distance is set to a value (for example, 50 m) that allows visual recognition of the trailer 200 from the hull 100a. This is because the manual trailering can be appropriately performed when the hull 100a is at a low speed and the trailer 200 is in a viewing range. In addition, if the predicted trajectory 500 is estimated in a state where the manual trailering condition is not satisfied, the estimation accuracy of the predicted trajectory 500 deteriorates.

In step S106, in a case where it is determined that the manual trailering condition is not satisfied, the CPU 102 returns the process to step S103, whereas in a case where it is determined that the manual trailering condition is satisfied, the CPU 102 advances the process to step S107. It is noted that it is not essential to provide step S106.

In step S107, the CPU 102 executes an estimation process. In this estimation process, the CPU 102 generates the predicted trajectory 500 based on the characteristic information 111a acquired in step S101, the relative position information acquired in step S104, and the steering angle acquired in step S105. For example, the CPU 102 obtains the turning radius corresponding to the steering angle from the characteristic information 111a. Further, the CPU 102 generates, based on the obtained turning radius, the predicted trajectory 500 with the position of the hull 100a indicated by the relative position information as a starting point.

In step S108, the CPU 102 executes a display process of displaying the predicted trajectory display screen illustrated in FIG. 5 on the display unit 110. Namely, the CPU 102 displays, on the screen, an image including the hull mark 100P indicating the position of the hull 100a in the relative position information and the trailer mark 200P indicating the position of the target trailer in the relative position information, and further displays the predicted trajectory 500 in a state of being superimposed on this image (for example, the screen A1). As a result, the vessel operator can visually recognize the predicted trajectory 500 on the image in which the positional relationship between the hull 100a and the trailer 200 is known, and thus the vessel operator can appropriately determine how he/she should steer the vessel thereafter.

In step S109, the CPU 102 determines whether or not a situation is at least one of that the hull 100a has moved by a second predetermined distance after the last generation of the predicted trajectory 500, or that a predetermined period of time has elapsed after the last generation of the predicted trajectory 500. The last predicted trajectory 500 is generated in the immediately preceding step S107. It is noted that, in step S107, clocking to determine the elapse of the predetermined period of time is started. The CPU 102 continues the determination in step S109 until the hull 100a moves by the second predetermined distance or the predetermined period of time elapses after the last generation of the predicted trajectory 500.

In step S109, the CPU 102 returns to step S103 in a case where at least one of the hull 100a has moved by the second predetermined distance after the last generation of the predicted trajectory 500, or that the predetermined period of time has elapsed after the last generation of the predicted trajectory 500, is satisfied. Therefore, by the next processes of steps S103 to S108, the new predicted trajectory 500 is generated based on the characteristic information 111a acquired in step S101, the newly acquired relative position information, and the newly detected steering angle, to the predicted trajectory display screen is updated (for example, the screen A2 the screen A3).

Therefore, the predicted trajectory display screen is updated every time the hull 100a moves by the second predetermined distance or every time the predetermined period of time elapses. It is noted that, in step S109, the determination may be made using only one of the traveling distance of the hull 100a after the last generation of the predicted trajectory 500 and the elapsed time after the last generation of the predicted trajectory 500. It is noted that it is not essential to provide step S109, and the process may proceed to step S103 after step S108.

According to the present preferred embodiment, at the time of manual trailering, the predicted trajectory 500 is generated based on the characteristic information 111a indicating the relationship between the steering angle of the hull 100a and the turning radius of the hull 100a, the relative position information between the trailer 200 and the hull 100a, and the detected steering angle. On the display screen, an image indicating the positional relationship between the hull 100a and the trailer 200 and the predicted trajectory 500 are superimposed and displayed.

As a result, the vessel operator can grasp how the hull 100a moves at the current steering angle or how to correct steering in order to suitably load the marine vessel 100 onto the trailer 200 by visually recognizing the predicted trajectory 500 while visually recognizing the relative position between the hull 100a and the trailer 200. For example, when the vessel operator rotates the steering wheel 112, the display of the predicted trajectory 500 changes in conjunction therewith, which allows even a beginner to feel a correspondence between the steering and the predicted trajectory 500. As a result, the trailering operation by the vessel operator is assisted.

In addition, the predicted trajectory display screen is updated every time the vessel moves by the second predetermined distance and/or every time the predetermined period of time elapses, which allows the vessel operator to visually recognize the latest positional relationship between the hull 100a and the trailer 200 and the latest predicted trajectory 500.

In a case where at least one of the speed of the hull 100a or the distance L does not satisfy the predetermined condition, the predicted trajectory 500 is not generated (NO in S106). Therefore, it is possible to avoid generation and display of the predicted trajectory 500 with low accuracy.

In the first preferred embodiment, the following first, second, and third modifications may be applied.

In the first modification, the characteristic information 111a may include information (for example, a time constant $\tau$) indicating a speed at which the turning radius changes from a current value to a steady value according to the steering angle. The time constant $\tau$ is, for example, a period of time required for the turning radius to become 63% or about 63% of the steady value. In this case, in the estimation process (S107), the turning radius corresponding to the steering angle is obtained from the characteristic information 111a, and the predicted trajectory 500 is generated based on the turning radius and the time constant $\tau$. As a result, the predicted trajectory 500 can be obtained with higher accuracy.

In the second modification, the characteristic information 111a may include information indicating the turning radius with respect to a "combination of at least one parameter of the output of the propulsion device 120, the speed of the hull 100a, or the acceleration of the hull 100a; and the steering angle". In this case, in step S105, not only the steering angle but also the above-mentioned at least one parameter is acquired. In the estimation process (S107), the predicted trajectory 500 is generated based on the turning radius corresponding to the combination of the at least one parameter and the steering angle. As a result, the predicted trajectory 500 corresponding to the behavior of the hull 100a can be generated.

In the third modification, the CPU 102 may acquire, in step S105, disturbance information (for example, at least one of the wind speed, the wind direction, or the tide) by detection. Then, in the estimation process (S107), the CPU 102 may generate the predicted trajectory 500 based on the characteristic information 111a, the relative position information, the detected steering angle, and the detected disturbance information. As a result, a more accurate predicted trajectory 500 can be obtained in consideration of the disturbance.

It is noted that two or more of the first to third modifications may be applied in combination.

It is noted that, in the first preferred embodiment and modifications thereof, the disturbance information (for example, at least one of the wind speed, the wind direction, or the tide) may be acquired in step S105, and that the disturbance is in a predetermined state may be added to a satisfaction requirement of the manual trailering condition in step S106.

According to a second preferred embodiment of the present invention, in the predicted trajectory display process, it is determined whether or not the hull 100a can be loaded onto the trailer 200, and further, the relative relationship between the direction of the hull 100a and the direction of the trailer 200 is displayed so as to be known. Other points not specifically mentioned are similar to those of the first preferred embodiment. It is noted that only one of determining whether or not the hull 100a can be loaded onto the trailer 200 and displaying the relationship of the direction of the directions of the hull 100a and the trailer 200 relative to each other may be used.

Figure 7:
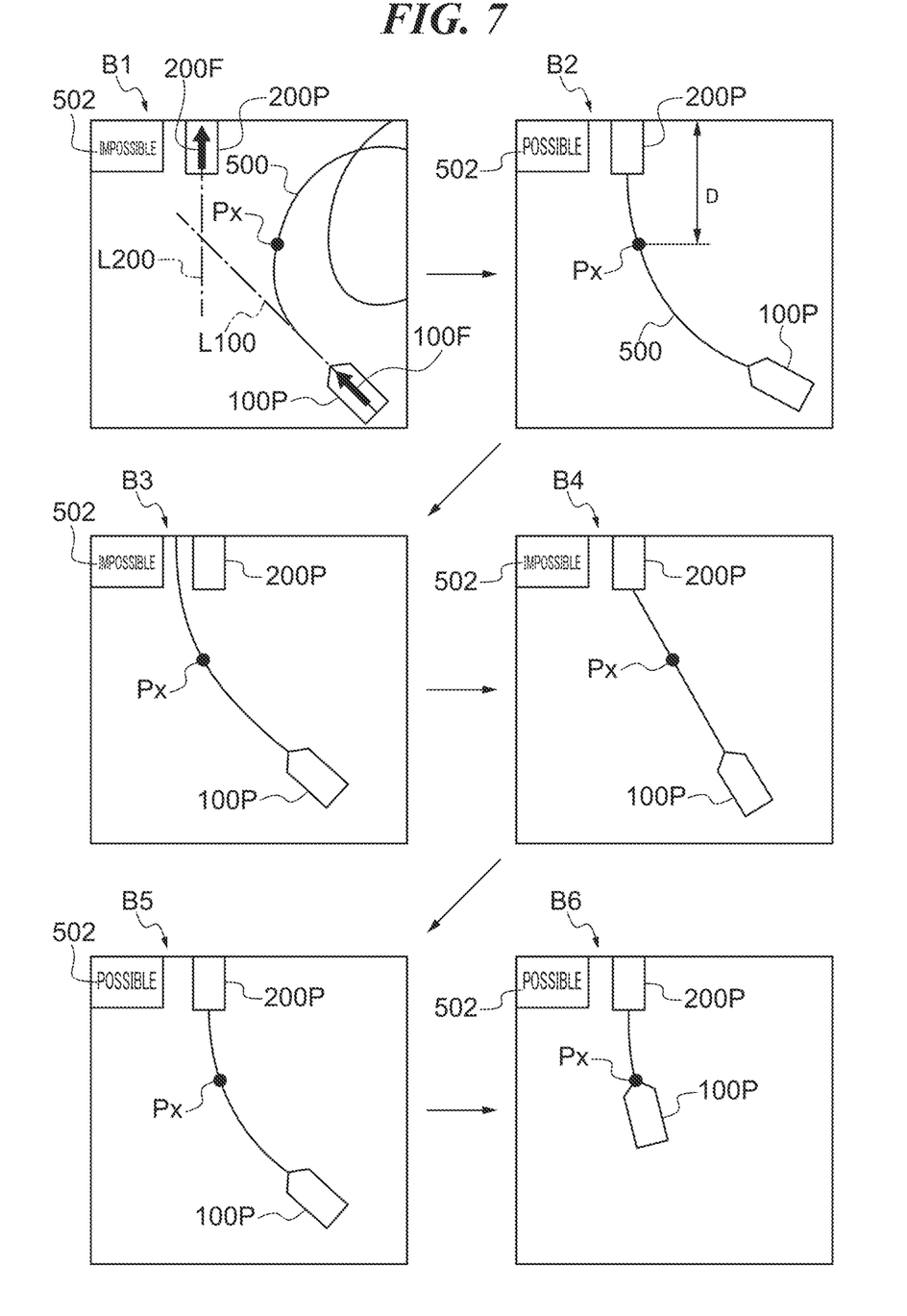
FIG. 7 is a transition diagram of a predicted trajectory display screen according to a second preferred embodiment of the present invention.

FIG. 7 is a transition diagram of a predicted trajectory display screen according to the second preferred embodiment. This predicted trajectory display screen is displayed on the display unit 110 by a predicted trajectory display process (to be described below with reference to FIG. 8) executed in parallel with the manual trailering. In FIG. 7, screens B1 to B6 corresponding to the transition of the state of the hull 100a are illustrated as the predicted trajectory display screens. The screens B1 to B6 are displayed after the start of the predicted trajectory display process is instructed and the target trailer is specified.

Similar to the example of FIG. 5 (the first preferred embodiment), the hull mark 100P and the trailer mark 200P are displayed on the predicted trajectory display screen. Further, the predicted trajectory 500 starting from the hull mark 100P is displayed in a superimposed manner on the indications of the hull mark 100P and the trailer mark 200P. In FIG. 7, as is distinct from the first preferred embodiment, the display position of the trailer mark 200P is used as a reference (fixed), and the relative position of the hull 100a with respect to the trailer 200 is indicated by the hull mark 100P.

As illustrated in the screen B1, an arrow-shaped mark 100F indicating the direction of the hull 100a is added to the hull mark 100P, and an extension line L100 of the center line of the mark 100F is further displayed. An arrow-shaped mark 200F indicating the direction of the trailer 200 is added to the trailer mark 200P, and an extension line L200 of the center line of the mark 200F is displayed. It is noted that, in FIG. 7, the marks 100F and 200F and the extension lines L100 and L200, which can actually be displayed in the screens B2 to B6, are omitted.

A relative relationship between the direction of the hull 100a and the direction of the trailer 200 is known by the mark 100F and the mark 200F. Particularly, when the extension line L100 and the extension line L200 are parallel to each other, it can be known that the directions of the hull 100a and the trailer 200 coincide with each other. When the extension line L100 and the extension line L200 almost coincide with each other at the time when the hull 100a comes close to the trailer 200, it can be known that the feasibility of loading the marine vessel 100 onto the trailer 200 is high.

It is noted that, from the viewpoint of understanding the relative relationship between the direction of the hull 100a and the direction of the trailer 200, only the mark 100F and the mark 200F, or only the extension line L100 and the extension line L200 may be displayed among the marks 100F and 200F and the extension lines L100 and L200.

Further, in a display area 502, "possible" indicating that the marine vessel 100 can be loaded onto the trailer 200 ("loadable") or "impossible" indicating that the marine vessel 100 cannot be loaded onto the trailer 200 ("unloadable") is displayed. As a result, the vessel operator is able to know whether the marine vessel 100 can be loaded onto the trailer 200 when vessel steering is continuously performed as it is.

A predetermined position Px is a position at which the trailer 200 and the hull 100a have a predetermined positional relationship on the predicted trajectory 500. As an example, the predetermined position Px is a position at which the distance L between the reference position PT of the trailer 200 and the reference position PB of the marine vessel 100 (refer to FIG. 2) in the longitudinal direction of the trailer 200 becomes a third predetermined distance D (exemplified in the screen B2). It is noted that the third predetermined distance D is predetermined to be 0 or a value lager than 0. It is not essential to display a mark indicating the predetermined position Px or an indication of the third predetermined distance D on the screen.

On condition that the predicted trajectory 500 passes through the trailer 200 and both an estimated trailer azimuth θ at the predetermined position Px and an estimated vessel azimuth φ at the predetermined position Px are within an allowable range, it is determined that loading can be performed. The "allowable range" mentioned herein is, for example, a range in which both the trailer azimuth θ and the vessel azimuth φ are within ±30 degrees (a range of −30 degrees or more and +30 degrees or less).

The screen B1 illustrates an initial state, which is a state immediately after the start of the predicted trajectory display process. In this state, the predicted trajectory 500 significantly deviates from the trailer mark 200P. The predicted trajectory 500 does not pass through the trailer 200, and thus "impossible" is displayed in the display area 502 in the screen B1.

The screen B2 is displayed in a state where the vessel operator operates the steering wheel 112, and steers the hull 100a so that the hull 100a heads toward the trailer 200. In this state, the predicted trajectory 500 passes through the trailer mark 200P. Moreover, both the estimated trailer azimuth θ and the estimated vessel azimuth φ at the predetermined position Px are within the allowable range. Therefore, "possible" is displayed in the display area 502 in the screen B2.

The screen B3 is displayed in a state where the hull 100a has been navigated after a state in which the screen B2 is displayed. As a result of the movement of the hull 100a, the predicted trajectory 500 deviates from the trailer mark 200P in the screen B3. Therefore, "impossible" is displayed in the display area 502 in the screen B3.

The screen B4 is displayed in a state where the vessel operator operates the steering wheel 112 again in a state where the screen B3 is displayed, and steers the hull 100a so that the hull 100a heads toward the trailer 200. In this state, the predicted trajectory 500 passes through the trailer mark 200P again. However, the predicted trajectory 500 is substantially straight, and at least one of the estimated trailer azimuth θ or the estimated vessel azimuth φ at the predetermined position Px exceeds ±30 degrees (out of the allowable range). Therefore, "impossible" is displayed in the display area 502 in the screen B4.

The screen B5 is displayed in a state in which the vessel operator operates the steering wheel 112 again in a state where the screen B4 is displayed, to correct the azimuth and the steering such that the shape of the predicted trajectory 500 becomes curved. In this state, the predicted trajectory 500 passes through the trailer mark 200P again. The predicted trajectory 500 passes through the trailer 200, and the estimated trailer azimuth θ and the estimated vessel azimuth φ at the predetermined position Px are both within ±30 degrees (within the allowable range). Therefore, "possible" is displayed in the display area 502 in the screen B5.

The screen B6 is displayed in a state where, after the screen B5 is displayed, the hull 100a moves along the predicted trajectory 500 and is located at the predetermined position Px, and the hull 100a (the marine vessel 100) is just before being loaded onto the trailer 200. In the screen B6, "possible" is still displayed in the display area 502. Normally, when this vessel steering state is continued, the loading of the marine vessel 100 onto the trailer 200 is performed.

Figure 8:
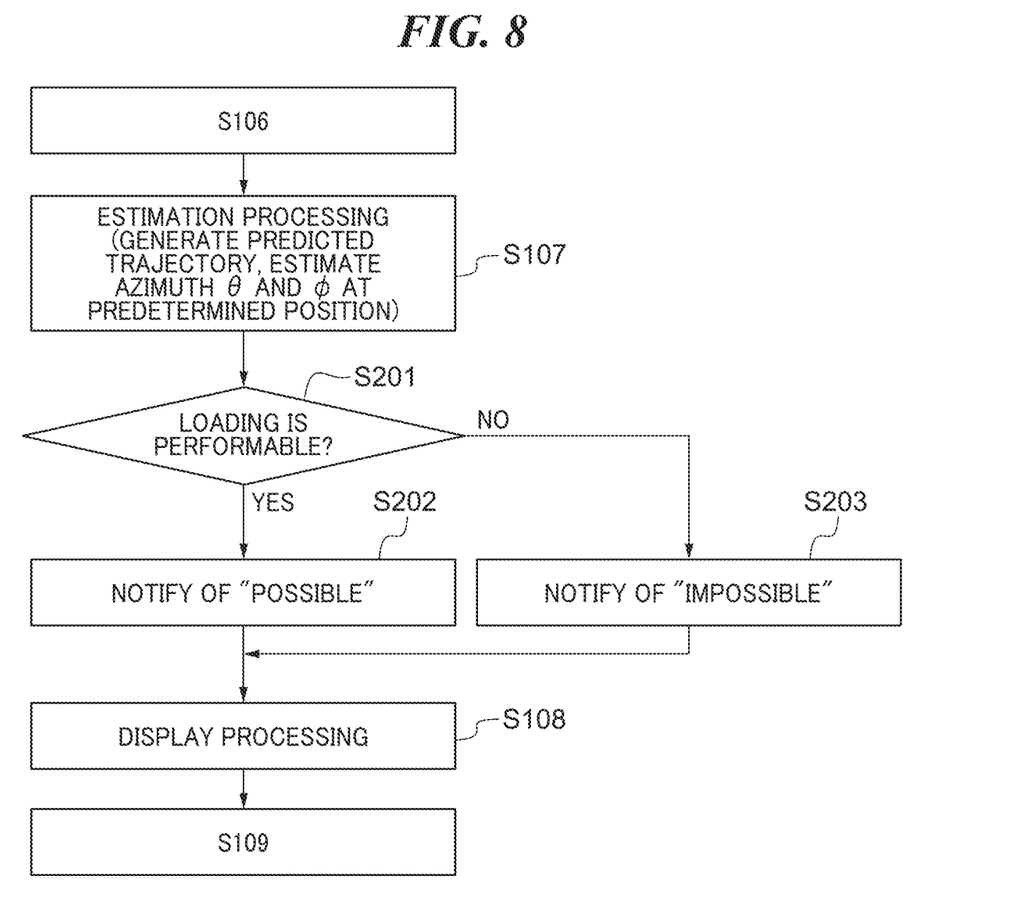
FIG. 8 is a flowchart illustrating predicted trajectory display process according to the second preferred embodiment of the present invention.

FIG. 8 is a flowchart illustrating the predicted trajectory display process according to the second preferred embodiment. A start condition and an execution subject of this process are similar to those of the predicted trajectory display process (FIG. 6) according to the first preferred embodiment. The predicted trajectory display process (FIG. 8) according to the second preferred embodiment is different from the flowchart of the predicted trajectory display process (FIG. 6) according to the first preferred embodiment in that steps S201 to S203 are added between steps S107 and S108. Furthermore, a portion of the process in steps S107 and S108 of the second preferred embodiment is different from that of the first preferred embodiment.

In the second preferred embodiment, the processes of steps S101 to S106 are similar to that of the first preferred embodiment. However, in the second preferred embodiment, the relative position information acquired in step S104 includes the current trailer azimuth θ and the current vessel azimuth φ.

In the estimation process in step S107, the CPU 102 generates the predicted trajectory 500 as in the first preferred embodiment. Further, the CPU 102 estimates the trailer azimuth θ and the vessel azimuth φ at the predetermined position Px from a tangential direction of the predicted trajectory 500 at the predetermined position Px, a predicted position of the hull 100a, and an absolute azimuth of the trailer 200.

In step S201, it is determined whether or not the hull 100a can be loaded onto the trailer 200. As described above, in a case where the predicted trajectory 500 does not pass through the trailer 200, the CPU 102 determines that the loading cannot be performed (NO in step S201). In a case where at least one of the trailer azimuth θ or the vessel azimuth φ at the predetermined position Px estimated in step S107 exceeds the allowable range (is out of the allowable range), the CPU 102 determines that the loading cannot be performed (NO in step S201). In a case where the predicted trajectory 500 passes through the trailer 200 and none of the estimated trailer azimuth θ and the estimated vessel azimuth φ exceeds the allowable range (both of the estimated trailer azimuth θ and the estimated vessel azimuth φ fall within the allowable range), the CPU 102 determines that the loading can be performed (YES in step S201).

In a case where it is determined that the loading can be performed, the CPU 102 displays "possible" in the display area 502 in step S202, thus providing notification that the loading can be performed. Thus, the vessel operator is able to know that the current trailering operation will be appropriately performed.

On the other hand, in a case where it is determined that the loading cannot be performed, the CPU 102 displays "impossible" in the display area 502 in step S203, thus providing notification that the loading cannot be performed. Thus, the vessel operator is able to know that the trailering operation should be corrected.

After steps S202 and S203, the process proceeds to step S108. In the display process in step S108, the CPU 102 displays the hull mark 100P and the trailer mark 200P on the screen. At this time, the CPU 102 also displays the marks 100F and 200F and the extension lines L100 and L200 on the screen so that the relative relationship between the direction of the hull 100a and the direction of the trailer 200 is known. Further, the CPU 102 displays the predicted trajectory 500 on this screen in a superimposed manner. Thereafter, the process proceeds to step S109. The process in step S109 of the second preferred embodiment is similar to that of the first preferred embodiment.

According to the second preferred embodiment, it is possible to achieve the effects similar to those of the first preferred embodiment regarding performing the trailering operation.

Further, the marks 100F and 200F and the extension lines L100 and L200 are displayed on the predicted trajectory display screen so that the relative relationship between the direction of the hull 100a and the direction of the trailer 200 are known, which makes it possible for the vessel operator to more easily determine whether or not the current operation state is appropriate.

When the predicted trajectory 500 does not pass through the trailer 200, or when at least one of the trailer azimuth θ or the vessel azimuth φ at the predetermined position Px on the predicted trajectory 500 exceeds the allowable range (is out of the allowable range), it notification is provided that the hull 100a cannot be loaded onto the trailer 200 (S203). Accordingly, it is possible to allow the vessel operator to know that the trailering operation should be corrected.

In addition, when the predicted trajectory 500 passes through the trailer 200 and neither the estimated trailer azimuth θ nor the estimated vessel azimuth φ exceeds the allowable range (both of them fall within the allowable range), notification is provided that the hull 100a can be loaded onto the trailer 200. Thus, the vessel operator knows that the current trailering operation will be appropriately performed.

It is noted that, on the predicted trajectory display screen, the display position of the hull mark 100P is used as the reference (fixed) in the first preferred embodiment (FIG. 5), and the display position of the trailer mark 200P is used as the reference (fixed) in the second preferred embodiment (FIG. 7). However, in the first preferred embodiment and the second preferred embodiment, it does not matter which display position of the hull mark 100P or the trailer mark 200P is fixed as a reference. In addition, it is not essential to display the predicted trajectory display screen (FIG. 5) with an azimuth such as the north being fixed. In addition, the predicted trajectory display screen (FIG. 7) may be displayed with an azimuth such as the north being fixed.

It is noted that the indication of "possible", the indication of "impossible", the hull mark 100P, the trailer mark 200P, the predicted trajectory 500, the marks 100F and 200F, the extension lines L100 and L200, and the like are merely examples of display modes, and display modes are not limited thereto. For example, whether or the hull 100a can be loaded onto the trailer 200 may be notified by displaying a message or the like, instead of displaying "possible" or "impossible". Instead of these displays or in addition to these displays, whether the hull 100a can be loaded onto the trailer 200 may be notified by sound or voice.

It is noted that in the first preferred embodiment and the second preferred embodiment, the method of providing notification of the positional relationship between the hull 100a and the trailer 200 of the relative relationship between the direction of the hull 100a and the direction of the trailer 200 and of the predicted trajectory 500 is not limited to the screen display. For example, in addition to the screen display or instead of the screen display, notification may be performed by sound or voice. In this case, for example, by issuing a voice message providing notification of the relative azimuth and distance of the trailer 200 with respect to the hull 100a, the positional relationship between them or the relative relationship between the directions of them may be notified. Further, for the predicted trajectory 500, a voice message may be issued to provide notification of whether or not the predicted trajectory 500 is passing through the trailer 200 and/or of whether or not the predicted trajectory 500 deviates from the trailer 200. When the predicted trajectory 500 deviates from the trailer 200, the direction of the deviation (left or right with respect to the trailer 200) and/or the amount of deviation may also be notified by a voice message.

Preferred embodiments of the present invention can also be realized by a process in which a program to perform one or more functions of the above-described preferred embodiments is supplied to a system or a device via a network or a non-transitory storage medium, and one or more processors or controllers of a computer of the system or the device reads and executes the program. The above program and the storage medium storing the above program are additional preferred embodiments of the present invention. Further, preferred embodiments of the present invention can also be implemented by a circuit (for example, ASIC) that performs one or more functions.

It is noted that preferred embodiments of the present invention are not limited to being applied to jet boats, and can also be applied to various marine vessels propelled by an outboard motor, an inboard motor, or an inboard/outboard motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A trailering support device for loading a hull onto a trailer, the trailering support device comprising:
   one or more controllers configured or programmed to function as:
      a first acquisition unit to acquire characteristic information indicating a relationship between a steering angle of the hull and a turning radius of the hull;
      a second acquisition unit to acquire relative position information between the trailer and the hull;
      a detector to detect the steering angle of the hull;
      a generation unit to predict future movement of the hull based on the characteristic information acquired by the first acquisition unit and the steering angle detected by the detector, and to generate a predicted trajectory; and
      a control unit configured to, on a display, display an image showing a positional relationship between the hull and the trailer based on the relative position information acquired by the second acquisition unit, and display the predicted trajectory on the image in a superimposed manner so as for a vessel operator to operate a steering device so that the predicted trajectory passes through a trailer displayed on the image.

2. The trailering support device according to claim 1, wherein the characteristic information includes information indicating a speed at which the turning radius changes from a current value to a steady value according to the steering angle.

3. The trailering support device according to claim 1, wherein the characteristic information includes information indicating the turning radius with respect to a combination of the steering angle and at least one parameter of an output of a propulsion device that propels the hull, a speed of the hull, or an acceleration of the hull.

4. The trailering support device according to claim 3, wherein
   the detector is configured to further detect the at least one parameter; and
   the generation unit is configured to generate the predicted trajectory based on the characteristic information, the relative position information, the detected steering angle, and the detected at least one parameter.

5. The trailering support device according to claim 1, wherein
   the detector is configured to further detect disturbance information; and
   the generation unit is configured to generate the predicted trajectory based on the characteristic information, the relative position information, the detected steering angle, and the detected disturbance information.

6. The trailering support device according to claim 1, wherein the relative position information includes position information of one of the hull and the trailer with reference to the other of the hull and the trailer as a reference.

7. The trailering support device according to claim 6, wherein the relative position information further includes a first azimuth which is an azimuth of the trailer as viewed from the hull and a second azimuth which is an azimuth of the hull as viewed from the trailer.

8. The trailering support device according to claim 7, wherein the control unit is configured to:
   estimate the first azimuth and the second azimuth at a position where the trailer and the hull define a predetermined positional relationship on the predicted trajectory; and
   in a case where at least one of the estimated first azimuth or the estimated second azimuth exceeds an allowable range, provide notification that the loading of the hull onto the trailer is not able to be performed.

9. The trailering support device according to claim 8, wherein the control unit is configured to provide notification that the loading of the hull onto the trailer is able to be performed in a case where the predicted trajectory passes through the trailer and neither the estimated first azimuth nor the estimated second azimuth exceeds the allowable range.

10. The trailering support device according to claim 8, wherein the allowable range is a range of about-30 degrees or more and about +30 degrees or less.

11. The trailering support device according to claim 1, wherein the control unit is configured to provide notification that the loading of the hull is not able to be performed in a case where the predicted trajectory does not pass through the trailer.

12. The trailering support device according to claim 1, wherein, when the hull moves by a predetermined distance and/or a predetermined period of time elapses after last generation of the predicted trajectory, the generation unit is configured to generate a new predicted trajectory based on the acquired characteristic information, the newly detected relative position information, and the newly detected steering angle.

13. The trailering support device according to claim 1, wherein the second acquisition unit is configured to specify the trailer on which the hull is to be loaded when acquiring the relative position information.

14. The trailering support device according to claim 1, wherein the detector is configured to further detect a speed of the hull;

the relative position information includes a distance between the hull and the trailer; and the generation unit is configured to not generate the predicted trajectory in a case where at least one of the speed of the hull or the distance does not satisfy a predetermined condition.

15. A trailering system comprising:

a marine vessel including a hull; and a trailering support device to load the hull onto a trailer, the trailering support device including:

one or more controllers configured or programmed to function as:

a first acquisition unit to acquire characteristic information indicating a relationship between a steering angle of the hull and a turning radius of the hull;

a second acquisition unit to acquire relative position information between the trailer and the hull;

a detector to detect the steering angle of the hull;

a generation unit to predict future movement of the hull based on the characteristic information acquired by the first acquisition unit and the steering angle detected by the detector, and to generate a predicted trajectory; and     a control unit configured to, on a display, display an image showing a positional relationship between the hull and the trailer based on the relative position information acquired by the second acquisition unit, and display the predicted trajectory on the image in a superimposed manner so as for a vessel operator to operate a steering device so that the predicted trajectory passes through a trailer displayed on the image.

16. A trailering support method for loading a hull onto a trailer, the trailering support method executable by a computer and comprising:

acquiring characteristic information indicating a relationship between a steering angle of the hull and a turning radius of the hull;

acquiring relative position information between the trailer and the hull;

detecting the steering angle of the hull;

predicting future movement of the hull based on the acquired characteristic information and the detected steering angle, and generating a predicted trajectory; and     displaying, on a display, an image showing a positional relationship between the hull and the trailer based on the relative position information acquired by the second acquisition unit, and display the predicted trajectory on the image in a superimposed manner so as for a vessel operator to operate a steering device so that the predicted trajectory passes through a trailer displayed on the image.

* * * * *